US009503318B2

(12) United States Patent
Kovacsiss, III

(10) Patent No.: US 9,503,318 B2
(45) Date of Patent: Nov. 22, 2016

(54) USING DNS FOR SECURITY SYSTEM EVENT REPORTING

(71) Applicant: Robert Bosch GmbH, Stuttgart (DE)

(72) Inventor: Stephan A. Kovacsiss, III, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 13/740,527

(22) Filed: Jan. 14, 2013

(65) Prior Publication Data

US 2013/0185390 A1    Jul. 18, 2013

Related U.S. Application Data

(60) Provisional application No. 61/586,748, filed on Jan. 14, 2012.

(51) Int. Cl.
| | |
|---|---|
| G06F 15/16 | (2006.01) |
| H04L 12/24 | (2006.01) |
| H04L 29/12 | (2006.01) |
| H04L 29/06 | (2006.01) |

(52) U.S. Cl.
CPC ....... H04L 41/0672 (2013.01); H04L 61/1511 (2013.01); H04L 61/2076 (2013.01); H04L 63/0209 (2013.01)

(58) Field of Classification Search
CPC  H04M 11/04; G06F 11/327; H04L 41/0672; H04L 61/1511; H04L 61/2076; H04L 63/0209
USPC ......................... 709/217, 219, 227, 223, 220
See application file for complete search history.

(56) References Cited

U.S. PATENT DOCUMENTS

2010/0049849 A1* 2/2010 Hershkovitz et al. ........ 709/224
2011/0040877 A1* 2/2011 Foisy ........................... 709/226

FOREIGN PATENT DOCUMENTS

EP    1791317 A1    5/2007

OTHER PUBLICATIONS

Bosch Security Systems, Inc.: "C900V2 Dialer Capture Module", Installation Guide F01U003472B, Jan. 1, 2005 (Jan. 1, 2005), pp. 1-32, XP055060455.*
International Search Report and Written Opinion for Application No. PCT/US2013/021397 dated Apr. 29, 2013 (10 pages).

(Continued)

*Primary Examiner* — Joseph E Avellino
*Assistant Examiner* — Marshall McLeod
(74) *Attorney, Agent, or Firm* — Michael Best & Friedrich LLP

(57) ABSTRACT

A method of transmitting a message from a security system to a central station receiver includes receiving at the security system an IP address associated with the central station receiver. An attempt is made to transmit the message from the security system to the central station receiver by use of the IP address. In response to a failure to receive at the security system an acknowledgement from the central station receiver that the message was received, the security system is used to query a Domain Name Server for a current IP address associated with the central station receiver. The query is dependent upon a domain name of the central station receiver. The current IP address associated with the central station receiver is received and used to re-attempt the transmitting of the message from the security system to the central station receiver.

20 Claims, 2 Drawing Sheets

(56) References Cited

OTHER PUBLICATIONS

Bosch Security Systems, Inc., "C900V2 Dialer Capture Module," Installation Guide F01U003472B, Jan. 1, 2005, pp. 1-32, XP055060455, Retrieved from Internet: URL:http//www.boschsecurity.com.mx/_archivos_productos_sitios_la/documentos/intrusion/EN/c900V2_install_0505_en.pdf.

Gralla, Preston, "Windows XP Hacks, 2nd Edition," Feb. 2009, O'Reilly Media, Safari Books, XP007921800, ISBN: 978-0-596-10535-8.

Bosch Security Systems, Inc., "D9412GV4/D7412GV4/D7212GV4 Control Panels," Quick Reference Guide F01U215242, Oct. 1, 2011, pp. 1-32, Retrieved from Internet: URL:http//stna.resource.bosch.com/documents/GV4_Series_Control_P_Quick_Installation_Guide_enUS_4671797003.pdf.

Anne Insero, "Bosch announces new G Series Control Panels with expanded capacity and improved performance," Press Release, Jan. 11, 2012, pp. 1-2, XPO55060486, Retrieved from Internet: URL:http//www.boschsecurity.us/NR/rdonlyres/AF1A1CDF-E0D8-4ED3-9154-1E9DED40CC1C/10073/GV4_Press_Release_FINAL.pdf.

European Patent Office Action for Application No. 13704257.8 dated Jul. 16, 2015 (8 pages).

* cited by examiner

USING DNS FOR SECURITY SYSTEM EVENT REPORTING

BACKGROUND OF THE INVENTION

1. Field of the Invention

The present invention relates to a method of transmitting security system messages, and, more particularly, to transmitting security system messages via the Internet.

2. Description of the Related Art

It is known for a control panel of a security system to be programmed to transmit an alarm signal or other message to a static internet protocol (IP) Address that is assigned to the central station receiver for the sending of messages to the central station. Most alarm manufactures currently require that the receiving equipment have a static IP Address in order for control panels to communicate with the receiving equipment.

In the event that the IP Address changes due to an ISP change or due to a need to re-route the signals to another receiver at a different address, all of the control panels that communicate with that central station have to be reprogrammed.

SUMMARY OF THE INVENTION

The invention may provide a method of transmitting security system messages by identifying a Domain Name to the central monitoring center in conjunction with the DNS (Domain Name System) without the DNS Server being a point of failure.

The invention reduces or eliminates the possibility that the DNS system could be a point of failure during the transmission of messages from a control panel to the central station receiver. In normal network operations, the PC or device that uses DNS routinely looks up the IP Address that is associated with the Domain Name that is being used. In the unlikely event that the DNS server is not available, then an IP Address cannot be obtained and a DNS error message is returned. The introduction of DNS by the invention may eliminate the need to reprogram the panel in order to transmit a message if the IP Address has to be changed.

The invention provides a method of looking up the IP Address of the Domain Name and not relying on any DNS server for subsequent communications thereafter. The control panel may query the DNS server only upon initial power-up or after a programming change to the Domain Name entry in the control panel programming. After the control panel retrieves the initial IP Address, the control panel uses the IP Address that is received from the DNS server for the first communication with the receiver. After the first successful communication has occurred, the control panel may save or cache that IP Address and use that IP Address for all communications without requiring the control panel to query or verify any data with any DNS server. After this point in time, the control panel may treat the IP Address as static except in the case of a failure to receive an acknowledgement from the receiver. If a failure to receive an acknowledgement from the receiver occurs, the control panel may check that the IP Address has not changed and may keep track of the retry count or the communication status regardless of the results of the query. If the query fails or returns the same IP Address, then the control panel may continue to use that IP Address as though nothing has changed. Else, if a new IP Address is returned with the DNS query, then the control panel may attempt to use the new IP Address, although the control panel may not alter its number of retries or process for trouble. If there is a failure to communicate with the receiver, it may be treated identically as though the control panel were programmed with a static IP Address for its destination. Thus, the failure of a DNS server may not cause any disruption in the communication status and service.

The invention comprises, in one form thereof, a method of transmitting a message from a security system to a central station receiver, including receiving at the security system an IP address associated with the central station receiver. An attempt is made to transmit the message from the security system to the central station receiver by use of the IP address. In response to a failure to receive at the security system an acknowledgement from the central station receiver that the message was received, the security system is used to query a Domain Name Server for a current IP address associated with the central station receiver. The query is dependent upon a domain name of the central station receiver. The current IP address associated with the central station receiver is received and used to re-attempt the transmitting of the message from the security system to the central station receiver.

The invention comprises, in another form thereof, a method of transmitting a message from a security system to a central station receiver, including receiving at the security system an IP address associated with the central station receiver. An attempt is made to transmit the message from the security system to the central station receiver by use of the received IP address. It is detected that the security system failed to receive an acknowledgement from the central station receiver that the message was received. In response to the failure to receive the acknowledgement, the security system is used to query a Domain Name Server for a current IP address associated with the central station receiver. The query is dependent upon a domain name of the central station receiver. If the security system fails to receive the current IP address associated with the central station receiver from the Domain Name Server, then the previously received IP address associated with the central station receiver is used to re-attempt the transmission of the message from the security system to the central station receiver.

The invention comprises, in yet another form thereof, a method of transmitting a plurality of messages from a security system to a central station receiver, including receiving at the security system an IP address associated with the central station receiver. A plurality of first messages are transmitted from the security system to the central station receiver by use of the IP address. The first messages are transmitted without confirming a correctness of the IP address with a Domain Name Server. An attempt is made to transmit a subsequent second message from the security system to the central station receiver by use of the IP address. The attempt to transmit is made without confirming the correctness of the IP address with the Domain Name Server. It is detected that the security system failed to receive an acknowledgement from the central station receiver that the second message was received. In response to the failure to receive the acknowledgement, the security system is used to query the Domain Name Server for an updated IP address associated with the central station receiver. The query is dependent upon a domain name of the central station receiver. The updated IP address associated with the central station receiver is received and used to re-attempt the transmitting of the second message from the security system to the central station receiver.

DESCRIPTION OF THE PRESENT INVENTION

Figure 1:
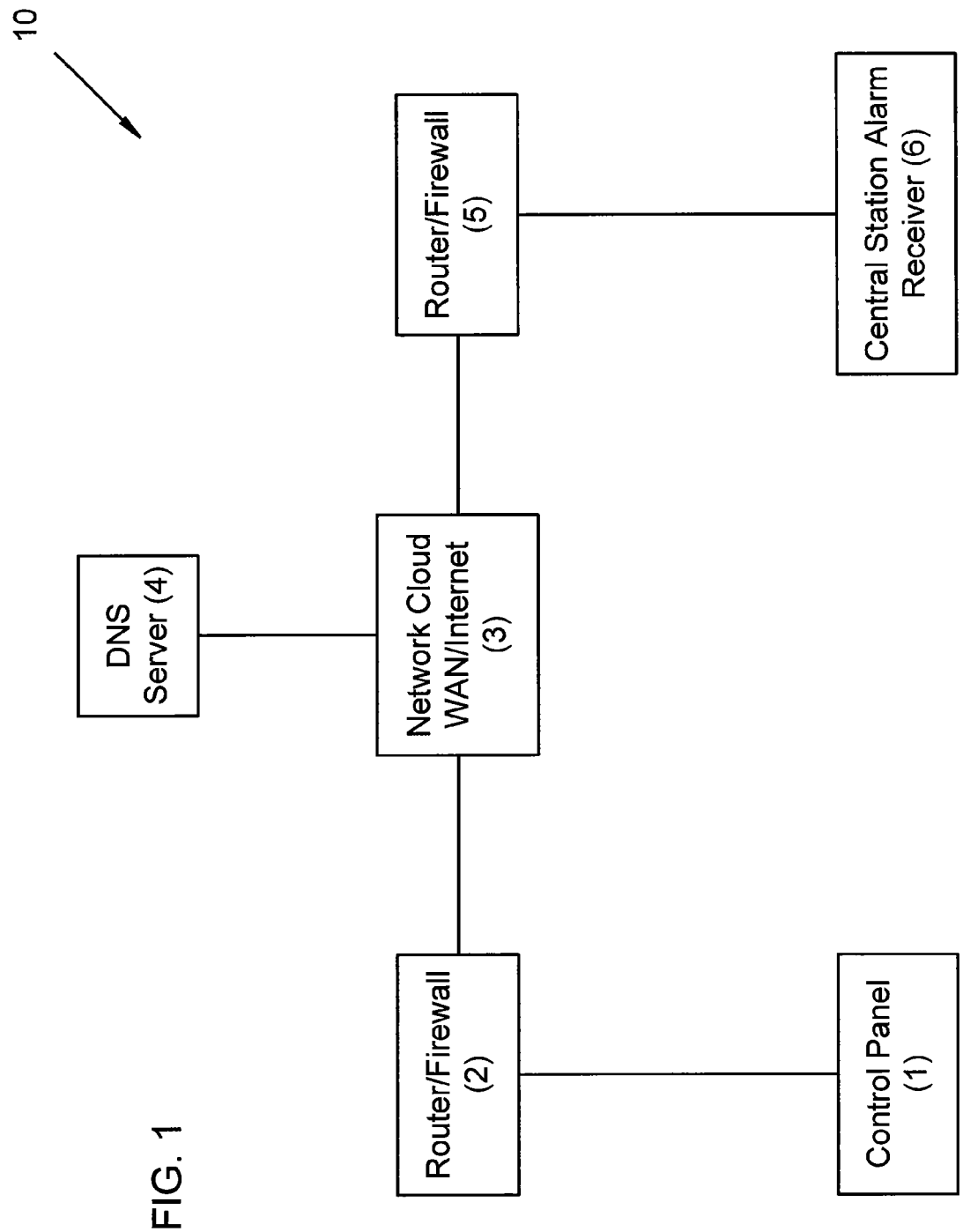
FIG. 1 is a block diagram of one embodiment of a security arrangement of the present invention.

Security arrangement 10 (FIG. 1) includes a control panel 1 at the protected premises, an optional premises side router/firewall 2, which may be at the protected premises, a network cloud WAN/Internet (e.g., ISP, Internet, private WAN, etc.) 3, a DNS server 4, an optional public side router/firewall 5, which may be at the central station, and a central station alarm receiver 6, which may be at the central station. Central station alarm receiver 6 may be a hardware receiver or a software receiver. It may be advantageous to have a static IP Address for the IP Address at the Central Station public side of the router. After control panel 1 is programmed and brought online for the first time, control panel 1 may query DNS Server 4 and cache the public IP Address which control panel 1 receives for router 5 which is in front of receiver 6. Control panel 1 may then send its first message to receiver 6 and may synchronize with receiver 6. As used herein, "message" may include an alarm event signal, a status update, or a supervision message, for example. Control panel 1 from that point in time onwards may consider the receiver IP Address to be a static IP address and control panel 1 may not query DNS Server 4 as long as the public IP address of router 5 does not change. In this scenario, the DNS Server 4 is not a point of failure because control panel 1 does not look to server 4 to verify the IP address. Thus, central station receiver 6 may need to be associated with a public IP Address. This may also be the case if the system were installed on a private WAN, except that the addresses would not be public. Rather, the addresses would be private addresses on the network.

In the scenario in which central station router 5 or ISP service is down, control panel 1 may verify that an acknowledgement signal (ACK) is received from the central station receiver 6 when a message is sent to receiver 6. In the case where nothing is received from the central station receiver 6, control panel 1 may query DNS Server 4 to verify the IP address associated with the central station receiver 6 in order to determine whether the IP address has changed. As used herein, an IP address "associated with" central station receiver 6 may encompass an IP address of central station router 5 or, in the case of some alternative hardware configuration, an IP address that may be used to direct a message to central station receiver 6. If the DNS Server 4 is not available, then control panel 1 may continue to attempt to send its messages to the same IP address that control panel 1 had cached originally, and control panel 1 may simply assume that the IP address has not changed. If the DNS Server 4 returns the same old IP address, control panel 1 may continue to attempt to send its messages to the same IP address and not alter the number of attempts. After all attempts to send the message are completed, control panel 1 may declare that a communication failure has occurred in the same manner as if control panel 1 were programmed with a static IP address for the destination.

In the scenario that the central station receiver 6 needs to change its public IP address for reasons such as a new ISP or changes by the ISP, control panel 1 may verify that an acknowledgement signal (ACK) is received from the central station receiver 6 when a message is sent to receiver 6. In the case where nothing is received from the central station receiver 6 because the old IP address is no longer valid, then control panel 1 may query the DNS Server 4 to verify the IP address associated with the central station receiver 6 in order to determine whether the IP address has changed. The DNS Server 4 may return a new IP address for the central station receiver 6. Control panel 1 may then use the new IP address to attempt to send the message to the central station receiver 6 on the next attempt and may not alter the number of attempts, or count the number of attempts, that control panel 1 has already tried. When a valid ACK or non-acknowledgement signal (NACK) is received, control panel 1 may then cache the new IP address and use the new IP address from that point in time forward as though the address is a static IP address. In this scenario, control panel 1 may not declare a communication failure or trouble event. Thus, the DNS Server 4 may improve the level of service to the system. That is, if the DNS Server 4 had not been online, then control panel 1 would have declared a communication failure in the same manner as if a static IP Address were programmed in the control panel.

All of the scenarios may enable control panel 1 to continue normal operation in the event that the IP address associated with the central station receiver 6 has to change due to an ISP change or has to temporarily change due to a pending disaster that could affect a central station. Central stations at times have to move the monitoring to another site in the event of a pending or immediate disaster. When using the public switched telephone network (PSTN), the central stations simply forward the phone numbers to another site. However, when using the Internet and IP Addresses, there is not a known solution. The invention implements DNS to provide a solution in that scenario, and enables IP devices to automatically find the receiver without normal operation being affected.

Figure 2:
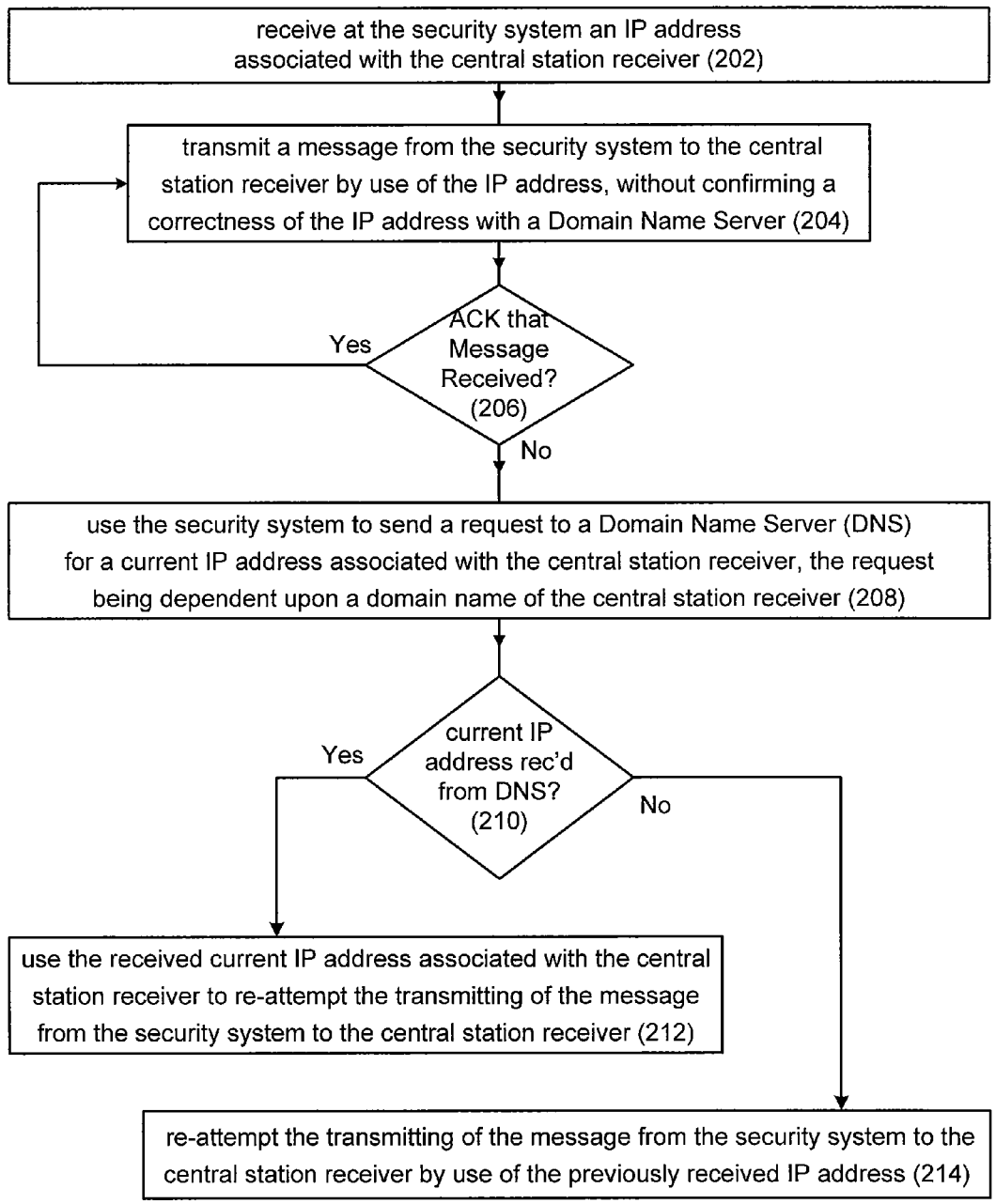
FIG. 2 is a flow chart of one embodiment of a method of the present invention for transmitting a plurality of messages from a security system to a central station receiver.

One embodiment of a method 200 for transmitting a plurality of messages from a security system to a central station receiver is illustrated in FIG. 2. In a first step 202, an IP address associated with a central station receiver is received at a security system. For example, a control panel 1 of a security system may request from a Domain Name Server (DNS) 4 the IP address associated with a central station receiver 6. The request may be transmitted over the Internet 3 and may refer to a domain name of the central station receiver. In response, the DNS may find the IP address that that DNS has stored in association with the domain name, and DNS may then transmit the found IP address to the control panel over the Internet. Alternatively, the control panel may have the IP address associated with the central station receiver loaded into the memory of the control panel by a human installer when the control panel is installed or when manufactured at a factory.

In a next step 204, a message is transmitted from the security system to the central station receiver by use of the IP address, without confirming a correctness of the IP address with a Domain Name Server. That is, the security system may assume that the earlier received IP address associated with the central station receiver is still correct. Thus, the security system may transmit the message to the earlier received IP address without checking with DNS or any other external source to ensure that the IP address is still correct for that particular central station receiver.

Next, in step 206, it is determined whether an acknowledgement has been received that the message was received at the central station receiver. For example, the control panel of the security system may keep track of whether the control panel has received, via the Internet or a private network, an acknowledgement from the central station receiver that the central station receiver has received the earlier transmitted message from the control panel. If it is determined in step 206 that the security system has received an acknowledgement that the message has been received by the central station receiver, then operation continues normally in step 204 where another message is transmitted from the security system to the central station receiver by use of the same IP address. Else, if it is determined in step 206 that the security system has not received an acknowledgement that the message has been received by the central station receiver, then operation proceeds to step 208 as described below.

In step 208, the security system is used to send a request to the Domain Name Server for a current IP address associated with the central station receiver. The request is dependent upon a domain name of the central station receiver. For example, the control panel of the security system may send a request via the Internet to the Domain Name Server for a current IP address associated with the central station receiver. The request may include the domain name of the central station receiver. The domain name may have been programmed into the control panel at installation or at the factory, or may have been transmitted to the control panel via the Internet after installation.

In a next step 210, it is determined whether the current IP address associated with the central station receiver has been received from the Domain Name Server. For example, the control panel of the security system may keep track of whether the control panel has received, via the Internet or some other network, the current IP address associated with the central station receiver from the DNS in response to the request that the security system sent in step 208. If it is determined in step 210 that the control panel has received the current IP address associated with the central station receiver from the DNS, then operation continues to step 212 as described below. Else, if it is determined in step 210 that the control panel has not received the current IP address associated with the central station receiver from the DNS, then operation proceeds to step 214 as described below.

In step 212, the received current IP address associated with the central station receiver is used to re-attempt the transmitting of the message from the security system to the central station receiver. That is, the security system may re-transmit the message to the central station receiver, but this time by using the newly received IP address.

In step 214, the message is re-transmitted from the security system to the central station receiver by use of the previously received IP address. That is, the security system may re-transmit the message to the central station receiver by use of the same earlier received IP address that was used by the security system before the request was sent to the DNS. Thus, the security system continues to use the previously received IP address if a query to the DNS fails, and the DNS is not a point of failure.

As described above, the security system may treat IP addresses as static until the security system fails to receive acknowledgment from a receiver. That is, the DNS may be queried for a current or updated IP address only if there is a problem with the previously used IP address.

The term "Domain Name Server" has been used herein in singular form. However, it is to be understood that a single Domain Name Server may be replaced with a plurality of Domain Name Servers, which may or may not be in communication with each other, within the scope of the invention. These Domain Name Servers may be private or public servers.

While this invention has been described as having an exemplary design, the present invention may be further modified within the spirit and scope of this disclosure. This application is therefore intended to cover any variations, uses, or adaptations of the invention using its general principles.

What is claimed is:

1. A method of transmitting a message from a security system to a central station receiver, the method comprising:
   receiving, at the security system, a static IP address associated with the central station receiver;
   attempting to transmit the message from the security system to the central station receiver by use of the static IP address;
   detecting, at the security system, a failure to receive an acknowledgement from the central station receiver that the message was received;
   in response to the failure to receive the acknowledgement, using the security system to send a request to a Domain Name Server for a current IP address associated with the central station receiver, the request being dependent upon a domain name of the central station receiver;
   receiving the current IP address associated with the central station receiver;
   determining, at the security system, that the central station receiver is associated with the current IP address based on receiving the current IP address from the Domain Name Server;
   determining whether the current IP address is different than the static IP address; and
   when the current IP address is different than the static IP address, storing the current IP address in the security system as an updated static IP address and using the updated static IP address to re-attempt the transmitting of the message from the security system to the central station receiver.

2. The method of claim 1, wherein the security system includes a control panel, wherein the control panel is configured to use the static IP address except in the case of the failure to receive the acknowledgement, and wherein in the case of the failure to receive the acknowledgement, the control panel is configured to query the Domain Name Server for the current IP address.

3. The method of claim 1, wherein the message comprises an alarm event signal.

4. The method of claim 1, wherein the security system includes a control panel, wherein the control panel is configured to transmit a plurality of messages to the static IP address without communicating with the Domain Name Server until the security system fails to receive an acknowledgement from the central station receiver that one of the plurality of messages was received, and wherein when the control panel fails to receive an acknowledgement from the central station receiver, the control panel queries the Domain Name Server.

5. The method of claim 4, wherein the control panel receives the static IP address from the Domain Name Server before transmitting an initial message to the central station receiver.

6. The method of claim 1, wherein after the request has been sent to the Domain Name Server, and before the current IP address associated with the central station receiver has been received, the security system continues to attempt to transmit subsequent messages to the static IP address.

7. The method of claim 1, wherein the request includes the domain name associated with the central station receiver.

8. A method of transmitting a message from a security system to a central station receiver, the method comprising the steps of:
   receiving, at the security system, a static IP address associated with the central station receiver;
   attempting to transmit the message from the security system to the central station receiver by use of the static IP address;

detecting, at the security system, a failure to receive an acknowledgement from the central station receiver that the message was received;

in response to the failure to receive the acknowledgement, using the security system to send a request to a Domain Name Server for a current IP address associated with the central station receiver, the request being dependent upon a domain name of the central station receiver;

determining whether the current IP address is received from the Domain name Server;

determining, at the security system, that the central station receiver is associated with the current IP address based on receiving the current IP address from the Domain Name Server;

when the current IP address is different than the static IP address, storing the current IP address in the security system as an updated static IP address and using the updated static IP address to re-attempt the transmitting of the message from the security system to the central station receiver; and if the security system fails to receive the current IP address associated with the central station receiver from the Domain Name Server, then using the static IP address associated with the central station receiver to re-attempt the transmitting of the message from the security system to the central station receiver.

9. The method of claim 8, wherein the security system includes a control panel, wherein the control panel is configured to use the static IP address except in the case of the failure to receive the acknowledgement.

10. The method of claim 8, further comprising using the current IP address associated with the central station receiver to re-attempt the transmitting of the message from the security system to the central station receiver, when the security system receives the current IP address associated with the central station receiver from the Domain Name Server.

11. The method of claim 8, further comprising:
detecting, at the security system, a failure to receive an acknowledgement from the central station receiver that the re-transmitted message was received; and
in response to the failure to receive the acknowledgement that the re-transmitted message was received, then again using the static IP address associated with the central station receiver to again re-attempt the transmitting of the message from the security system to the central station receiver.

12. The method of claim 8, further comprising:
detecting, at the security system, a failure to receive an acknowledgement from the central station receiver that the re-transmitted message was received;
in response to the failure to receive the acknowledgement that the re-transmitted message was received, using the security system to send another request to the Domain Name Server for a current IP address associated with the central station receiver; and
if the security system again fails to receive the current IP address associated with the central station receiver from the Domain Name Server, then again using the static IP address associated with the central station receiver to re-attempt the transmitting of the message from the security system to the central station receiver.

13. The method of claim 8, wherein the security system includes a control panel, the control panel receiving the static IP address from the Domain Name Server before transmitting an initial message to the central station receiver, the control panel transmitting a plurality of subsequent messages to the static IP address without communicating with the Domain Name Server until the security system fails to receive the acknowledgement from the central station receiver.

14. The method of claim 8, wherein the request includes the domain name associated with the central station receiver.

15. A method of transmitting a plurality of messages from a security system to a central station receiver, the method comprising:
receiving, at the security system, an a first static IP address associated with the central station receiver;
transmitting a plurality of first messages from the security system to the central station receiver by use of the first static IP address, the transmitting being performed without confirming a correctness of the first static IP address with a Domain Name Server;
detecting an acknowledgement from the central station receiver that each of the plurality of first messages was received by the central station receiver;
determining at the security system that the central station receiver does not have a communication failure based on the acknowledgement;
attempting to transmit a subsequent second message from the security system to the central station receiver by use of the first static IP address, the attempt to transmit being performed without confirming the correctness of the first static IP address with the Domain Name Server;
detecting a failure to receive at the security system an acknowledgement from the central station receiver that the second message was received;
determining at the security system that the central station receiver has a communication failure based on the failure to receive an acknowledgement;
in response to the communication failure, using the security system to send a request to the Domain Name Server for an updated IP address associated with the central station receiver, the request being dependent upon a domain name of the central station receiver;
receiving the updated IP address associated with the central station receiver from the Domain Name Server; and
using the received updated IP address associated with the central station receiver to re-attempt the transmitting of the second message from the security system to the central station receiver;
detecting an acknowledgement from the central station receiver that the second message was received by the central station receiver;
determining, at the security system, that the central station receiver is no longer associated with the first static IP address based on detecting the acknowledgement;
determining, at the security system, that the central station receiver is associated with the updated IP address based on detecting the acknowledgement; and
storing the updated IP address in the security system as a second static IP address.

16. The method of claim 15, further comprising receiving, at the security system, a plurality of acknowledgements from the central station receiver, each of the acknowledgements indicating that a respective one of the first messages was received by the central station receiver.

17. The method of claim 15, wherein the security system receives the IP address from the Domain Name Server before transmitting an initial message to the central station receiver, the initial message being transmitted before any of the first messages are transmitted.

18. The method of claim 15, wherein the security system includes a control panel, wherein the control panel is configured to treat the IP address as a static IP address until the failure to receive the acknowledgement is detected.

19. The method of claim 15, wherein after the request has been sent to the Domain Name Server, and before the current IP address associated with the central station receiver has been received, the security system continues to attempt to transmit subsequent third messages to the previously received IP address.

20. The method of claim 15, wherein the request is indicative of the domain name associated with the central station receiver.

\* \* \* \* \*